E. G. JOHNSON & J. LEIDER.
COUPLING.
APPLICATION FILED SEPT. 1, 1908.
928,055.
Patented July 13, 1909.
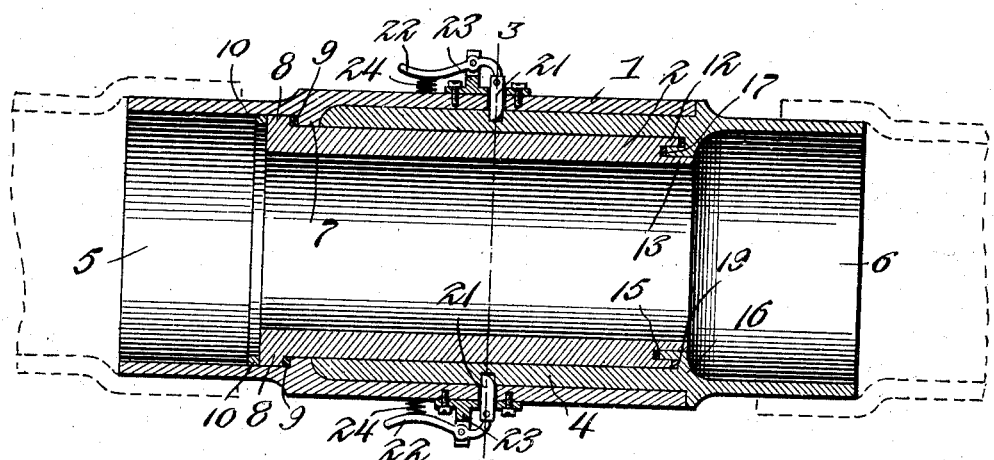
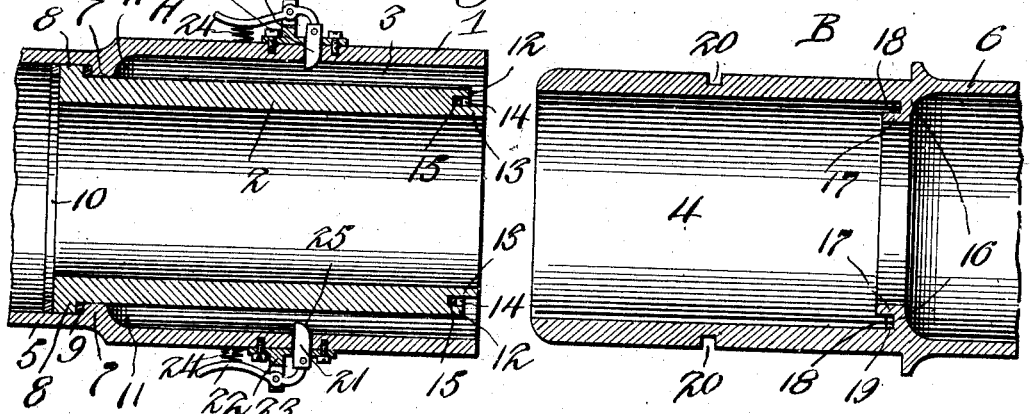
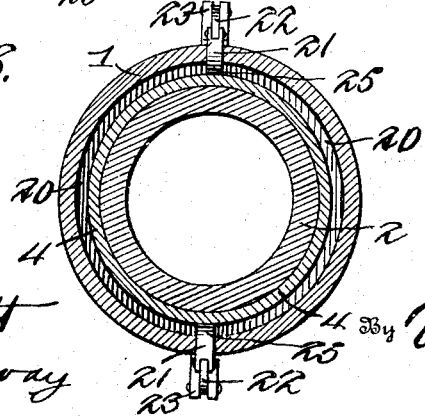
Witnesses
Hugh H. Ott
C. Bradway
Inventors
Elmer G. Johnson
James Leider
By Victor J. Evans
Attorney

UNITED STATES PATENT OFFICE.

ELMER G. JOHNSON AND JAMES LEIDER, OF WINNIPEG, MANITOBA, CANADA.

COUPLING.

No. 928,055.         Specification of Letters Patent.         Patented July 13, 1909.

Application filed September 1, 1908. Serial No. 451,238.

*To all whom it may concern:*

Be it known that we, ELMER G. JOHNSON and JAMES LEIDER, the former a citizen of the United States, the latter a subject of the King of Sweden, residing at Winnipeg, in the Province of Manitoba and Dominion of Canada, have invented new and useful Improvements in Couplings, of which the following is a specification.

This invention relates to couplings for attaching hose sections together and has for one of its objects to provide a coupling device composed of two sections which are connected or disconnected by relative longitudinal movement and provided with improved means for locking the sections together.

Another object of the invention is the provision of a coupling of this character which is comparatively simple and inexpensive to manufacture and so designed as to be easily and quickly connected and disconnected and leakage of liquid or fluid is positively prevented.

With these objects in view and others, as will appear as the description proceeds, the invention comprises the various novel features of construction and arrangement of parts which will be more fully described hereinafter and set forth with particularity in the claim appended hereto.

In the accompanying drawing which illustrates one of the embodiments of the invention, Figure 1 is a central longitudinal section of the coupling showing the two members or sections thereof connected. Fig. 2 is a similar view showing the sections disconnected. Fig. 3 is a transverse section on line 3—3 of Fig. 1.

Similar reference characters are employed to designate corresponding parts throughout the several views.

Referring to the drawing, A designates one member or section of the coupling and B the other section which are adapted to interfit by relative sliding movement, the latter telescoping in the former. Section A is composed of an outer sleeve or cylinder 1 and an inner sleeve or cylinder 2 arranged concentrically with respect to each other and the outer cylinder is of larger internal diameter than the external diameter of the inner cylinder so as to provide an annular chamber or pocket 3 into which the cylindrical portion of the section B is adapted to fit. The cylinder is provided with an extension or knuckle portion 5 over which the end of a hose is applied in any suitable manner, and the section B is also provided with an extension 6 for receiving the end of another piece of hose. At the inner end of the extension 5 the cylinder is provided with an annular flange 7 of substantially the same diameter as that of the inner cylinder 2 and the latter is provided with an external annular flange 8 that fits into the extension 5 and between these internal and external flanges on the two cylinders is a packing ring 9. The cylinder 2 is inserted in the outer cylinder by passing the inner end of the cylinder 2 inwardly through the extension 5, the packing ring 9 being first applied to the cylinder 2. After the cylinder has been inserted it is secured in place by a retaining ring 10 that is fitted in the extension 5 and against the outer end of the cylinder 2, such ring being fastened in any suitable manner as for instance by solder. One side of the internal flange 7 of the cylinder 1 is provided with a fillet 11 against which fits the rounded edge of the cylinder 4, then this rounded edge permits the cylinder 4 of the section to be readily entered in the annular chamber or pocket 3 of the section A. The inner end of the cylinder 2 is formed with two annular longitudinally extending flanges 12 and 13 supported by an annular recess 14, the flange 13 being longer than the flange 12 for a purpose hereinafter to appear, and in the recess is a packing ring 15.

The section or coupling member B is formed with an internal annular rib 16 which has a cylindrical flange 17 projecting from one side thereof which coöperates with the inner internal surface of the cylinder 4 to form an annular recess or groove 18 to receive a packing ring 19. The annular flange 13 of the section A enters the annular flange 17 of the section B while such latter flange enters the recess 14 and the flange 13 enters the recess 18, and by means of the packing rings a perfectly fluid tight joint is provided. Adjacent the middle of the cylinder 4 is an annular groove 20 for receiving the inner ends of dogs or locking members 21 arranged on the section A. The locking members are preferably located at diametrically opposite points and are connected with releasing levers 22 mounted on bearings 23 and movably secured to the cylinder 1, and interposed between the members 22 and cylinder 1 are springs 24 that hold the locking members in position. The locking members are rounded at 25 so that as the cylinder 4 slides into the pocket 3 the rounded edge 12 of such cylinder will strike the rounded ends of the locking members and cause the latter to move outwardly against the tension of the springs 24 until the annular groove 20 is opposite the locking members. At this point the springs will expand and force the locking members into the groove 20 for fastening the two sections of the coupling together, the annular groove permitting the locking members to engage at any point around the coupling member B. In order to release the members the levers 22 are compressed so as to withdraw the locking members or dogs 22 out of the groove 20 so as to thereby permit the coupling members to be pulled apart. It will thus be seen that the parts can be connected and disconnected with extreme ease and rapidity and by the close interfit of the parts and arrangement of packing rings leakage of liquid and loss of pressure will be effectively prevented.

From the foregoing description, taken in connection with the accompanying drawing, the advantages of the construction and of the method of operation will be readily apparent to those skilled in the art to which the invention appertains, and while we have described the principle of operation of the invention, together with the apparatus which we now consider to be the best embodiment thereof, we desire to have it understood that the apparatus shown is merely illustrative, and that such changes may be made when desired as are within the scope of the claim appended hereto.

Having thus described the invention, what is claimed as new is:—

A device of the class described comprising a coupling member composed of connected inner and outer cylinders forming an annular chamber, internal and external annular flanges on the outer and inner cylinders respectively, a packing disposed between the said flanges, and a retaining ring secured in the outer cylinder and engaging the end of the inner cylinder for holding the same in place, cylindrical flanges secured to the inner end of the inner cylinder and spaced apart to form a recess, a packing ring in the recess, a second member consisting of a cylinder arranged to fit in the annular chamber, an internal annular rib on the second member and having a cylindrical flange arranged to enter the recess between the two flanges on the inner cylinder of the first member, there being an annular recess around the said cylindrical flange to receive one of the annular flanges on said inner cylinder, and a packing ring arranged in the last mentioned recess.

In testimony whereof we affix our signatures in presence of two witnesses.

ELMER G. JOHNSON.
JAMES LEIDER.

Witnesses:
VICTOR J. WALLIN,
C. E. JOHNSON.